W. R. WILLETTS.
TRAP FOR WASTE WATER PIPES.
APPLICATION FILED DEC. 9, 1909.
991,123.
Patented May 2, 1911.
3 SHEETS—SHEET 2.
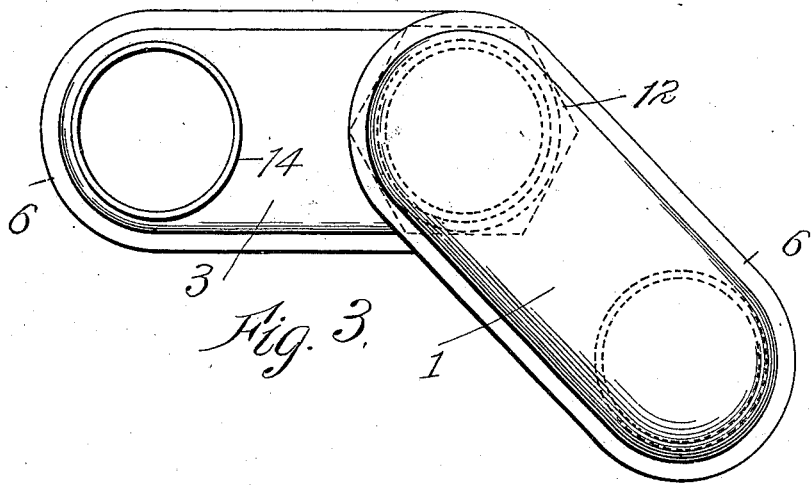
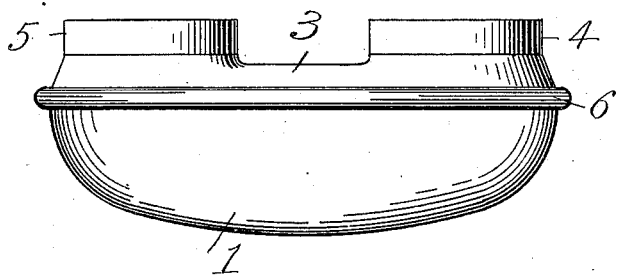
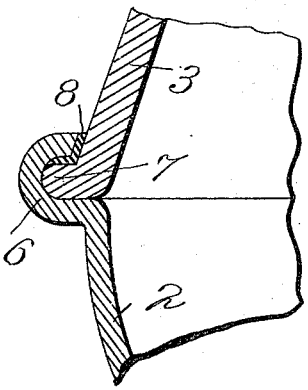
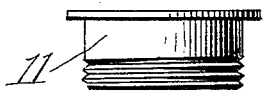
Witnesses:
Inventor
William R. Willetts
By his Attorney

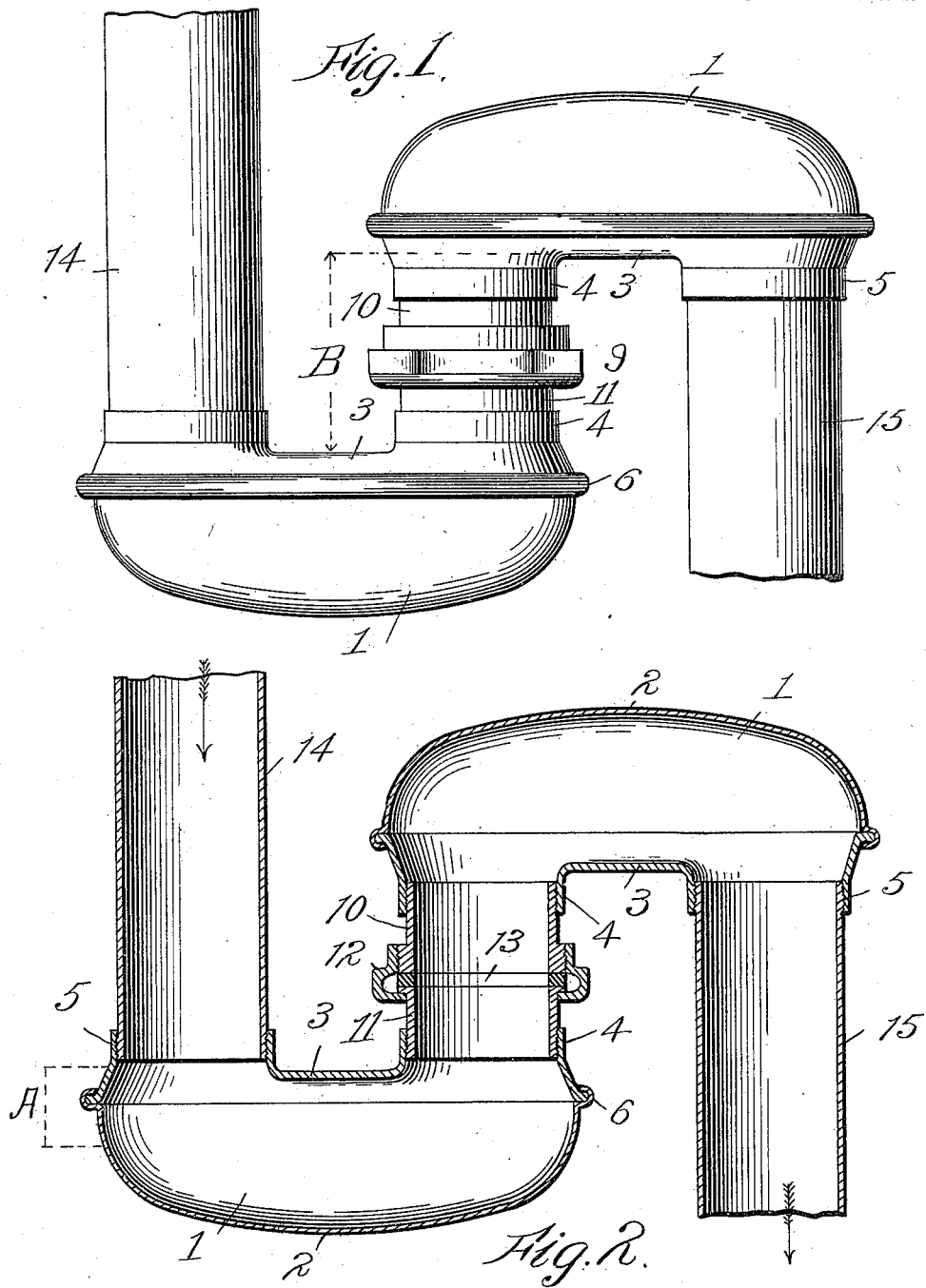

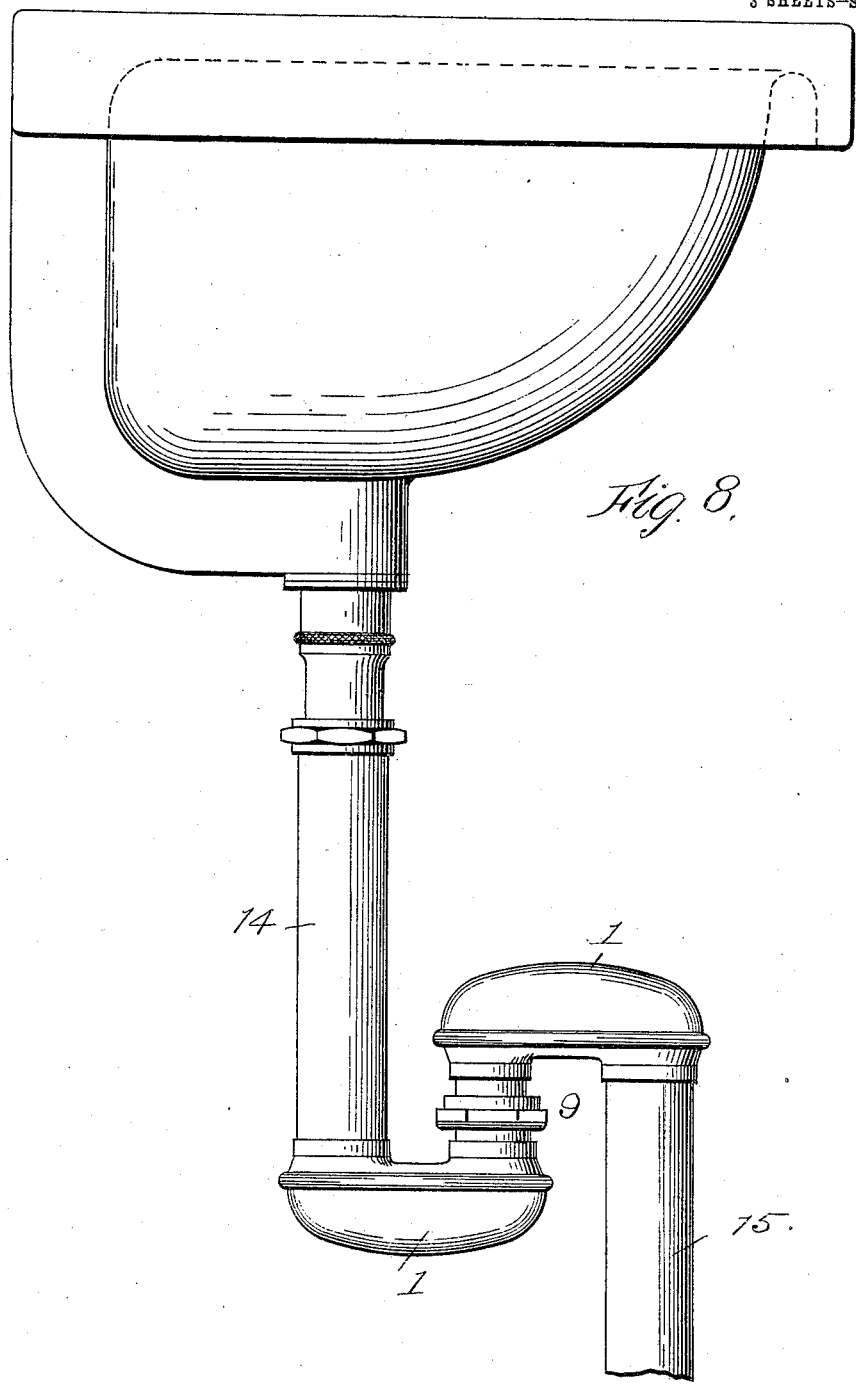

UNITED STATES PATENT OFFICE.

WILLIAM R. WILLETTS, OF WATERBURY, CONNECTICUT, ASSIGNOR TO AMERICAN PIN COMPANY, OF WATERBURY, CONNECTICUT, A CORPORATION OF CONNECTICUT.

TRAP FOR WASTE-WATER PIPES.

991,123. Specification of Letters Patent. Patented May 2, 1911.

Application filed December 9, 1909. Serial No. 532,150.

*To all whom it may concern:*

Be it known that I, WILLIAM R. WILLETTS, a citizen of the United States, and residing at Waterbury, in the county of New Haven and State of Connecticut, have invented certain new and useful Improvements in Traps for Waste-Water Pipes, of which the following is a full and clear specification illustrated in the accompanying drawings, the particularly novel features being more fully pointed out in the annexed claims.

The particularly novel features of my invention reside in the practical arrangement of the various elements of which the trap is composed and the advantages which I thereby gain are that this trap can be easily adapted to any distance between the inflow and discharge water pipe, of course within certain limits; that the trap can be easily dismounted, that the various members of it are easily accessible for cleaning purposes; that the trap is cheap to manufacture and easily installed, owing to its being combined of units of equal and uniform size, and lastly, that the trap has a neat appearance which feature is most essential in the so-called "open plumbing" used now-a-days.

In the accompanying drawings Figure 1 is a side elevation of the trap. Fig. 2 is a vertical longitudinal section throughout the trap shown in Fig. 1. Fig. 3 is a plan view of the trap shown in Fig. 1, but showing one member set at an angle to the other. Fig. 4 is a side elevation of one of the units of which the trap is composed. Fig. 5 is an enlarged view of the portion of Fig. 2 which I have indicated with A in order to illustrate in detail how the bead joint is formed. Fig. 6 is the threaded nipple, and Fig. 7 the flanged nipple of the union which joins the two units of the trap as illustrated in Figs. 1 and 2, and Fig. 8 is a general view of the trap as employed on a wash basin.

The trap as illustrated in Fig. 2 is composed of two interchangeable units 1 of uniform size and shape, such as is shown in Fig. 4. Each of such units consists of two halves 2 and 3, having the shape of an oblong shell, half 3 being shallower than half 2 and having at either end an opening surrounded by similar annular flanges 4 and 5 respectively, which are internally threaded. The annular flanges being similar in size enable each unit to be used interchangeably and end for end. These annular flanges are formed preferably by a suitable drawing process and they are integral with the half shell 3. The two halves of each unit 1 are joined together by a bead joint 6 which is illustrated in detail in Fig. 5. As will be seen from this figure, the upper half 3 is laterally flanged at its rim as shown at 7 while the lower half 2 is beaded at its rim as shown at 6, this beading being upset around flange 7 of the upper half. While this bead joint thus produced may be sufficiently tight merely by the metal to metal contact joined under pressure, or while it also might be soldered subsequently to withstand higher pressure, I prefer to interpose a washer or other suitable packing, preferably a fiber washer 8 between the bead and the flange before the joint is formed. This I find produces a tight joint which will withstand, if necessary, great pressure after the bead has been firmly pressed down upon flange 7. Two of such units are jointed together in S fashion by placing one of them upside down and joining them by means of union 9, the thread nipple 10 of the union being for instance screwed in the flange 4 of the upper union and the flange nipple 11 of the union being screwed in the flange 4 of the lower union as shown in Fig. 2. The laterally flanged union nut 12 holds the two nipples together with a suitable packing 13 between the nipples to insure tightness. Annular flange 5 of the lower unit 1 (Fig. 2) receives the pipe 14 through which the waste water enters the trap and annular flange 5 of the upper unit receives pipe 15 leading the waste water off. It is obvious that should it be desired, the depth B (Fig. 1) of the trap can be easily increased by making one or both nipples of union 9 of sufficient length to increase the depth of the trap to the desired amount.

From Fig. 2 it will be noted that the units can be easily disjoined by simply unscrewing nut 12 and turning the two ends of the two units facing each other, away from each other. Thus each of the two units is easily accessible for cleaning purposes.

From Fig. 3 it will be noted that owing to union 9 forming a pivot at which the two units are joined they can be set at any desired angle to adapt the trap to the distance between the inflow and discharge pipes 14 and 15 respectively.

In Fig. 8, I have illustrated as an example, how my novel trap is connected to a wash basin and it can be clearly seen in this illustration how conveniently this trap may be installed or also disconnected at the union 9 for cleaning purposes.

What I claim is:

1. An S-shaped water trap comprising lower and upper shallow units of equal size and oblong shape, the upper unit being inverted; each of the units being formed with corresponding end openings in the same plane and annular flanges similar in size to and surrounding the end openings; both units being interchangeable, and changeable end for end, and a union coupling the inner flanges of the units together.

2. An S-shaped water trap comprising lower and upper shallow units of equal size and of oblong shape, the upper unit being inverted; each of the units being constructed of sheet metal in two halves; the lower half being formed with a beaded rim and the upper half being formed with a laterally flanged rim interlocked with the beaded rim of the lower half, and also formed with corresponding end openings in the same plane and drawn up annular flanges similar in size to and surrounding the end openings, both units being interchangeable, and changeable end for end, and a union coupling the inner flanges of the units together.

WILLIAM R. WILLETTS.

Witnesses:
WHITMAN W. BOWERS,
A. J. BARNES.

---

Copies of this patent may be obtained for five cents each, by addressing the "Commissioner of Patents, Washington, D. C."